United States Patent Office 3,055,925
Patented Sept. 25, 1962

3,055,925
ALKYL LEAD PHOSPHATES
Robert J. Hartle, Gibsonia, Pa., assignor to Gulf Research & Development Company, Pittsburgh, Pa., a corporation of Delaware
No Drawing. Filed May 12, 1960, Ser. No. 28,531
8 Claims. (Cl. 260—437)

This invention relates to a novel class of organometallic salts of the substituted acids of phosphorus which are useful as rodenticides and insecticides and as addition agents for hydrocarbon compositions. The novel addition agents of this invention and particularly the alkyllead salts of the mono- and diesters of orthophosphoric acid are useful for increasing the octane rating of gasoline while simultaneously improving the preignition characteristics of the fuel.

The organometallic salts of the substituted acids of phosphorus of the invention are represented by the structural formula

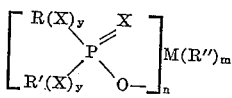

wherein X is selected from the group consisting of oxygen and sulfur; y is an integer from 0 to 1; R is a substituent selected from the class consisting of alkyl, alkenyl, alkynyl, aryl, aralkyl, alkaryl and cycloalkyl groups; R' is a substituent selected from the class consisting of alkyl, alkenyl, alkynyl, aryl, aralkyl, alkaryl, cycloalkyl and M(R'')$_{t-1}$ groups; R'' is a substituent selected from the class consisting of alkyl, aryl, aralkyl and alkaryl groups; M is a polyvalent metal; m is at least 1; n is at least 1; m+n is the valence of the metal M; t is the valence of the metal M; and wherein the total number of carbon atoms in the radical

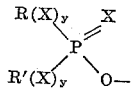

is at least 2.

The novel products of the invention are formed when a mono- or diester of an oxyacid of phosphorus or a thio analogue thereof having 1 to 2 hydrocarbon radicals each containing 1 to 22 carbon atoms is reacted with an organometallic compound in the ratio of about 0.5 to about 4 moles of the acid ester of phosphorus per mole of the organometallic compound.

The class of acid esters of phosphorus whose use is included by the present invention can be represented by the general formula

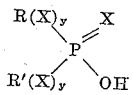

where R is a substituent selected from the class consisting of hydrogen, alkyl, alkenyl, alkynyl, aryl, aralkyl, alkaryl and cycloalkyl groups; R' is a substituent selected from the class consisting of alkyl, alkenyl, alkynyl, aryl, aralkyl, alkaryl and cycloalkyl groups; X is oxygen or sulfur; and y is an integer from 0 to 1. The total number of carbon atoms in the substituted acid of phosphorus is preferably 1 to 44. Those substituted acids of phophorus containing a total of at least 9 carbon atoms are especially preferred.

Preferred acids for use according to the invention are the acid esters of orthophosphoric acid. However, it is to be understood that the broader aspects of the invention include other substituted acids of phosphorus, examples of which are phosphonic acid, the monoester of phosphonic acid and phosphinic acid. Examples of some of the preferred acid esters are methyl amyl monoacid orthophosphate, ethyl amyl monoacid orthophosphate, isopropyl isoamyl monoacid orthophosphate, tertiary butyl isoamyl monoacid orthophosphate, di(n-amyl) monoacid orthophosphate, di(isoamyl) monoacid orthophosphate, di(hexyl) monoacid orthophosphate, ethyl hexynyl monoacid orthophosphate, ethyl hexyl monoacid orthophosphate, di(2-ethylhexyl) monoacid orthophosphate, mono(2-ethylhexyl) diacid orthophosphate, mono(n-octyl) diacid orthophosphate, di(n-octyl) monoacid orthophosphate, methyl n-octyl monoacid orthophosphate, ethyl n-octyl monoacid orthophosphate, n-propyl n-octyl monoacid orthophosphate, mono(isooctyl) diacid orthophosphate, di(isooctyl) monoacid orthophosphate, isopropyl isooctyl monoacid orthophosphate, oleyl isooctyl monoacid orthophosphate, isoamyl isooctyl monoacid orthophosphate, mono(nonyl) diacid orthophosphate, di(nonyl) monoacid orthophosphate, methyl nonyl monoacid orthophosphate, ethyl nonyl monoacid orthophosphate, propyl nonyl monoacid orthophosphate, di(decyl) monoacid orthophosphate, methyl decyl monoacid orthophosphate, ethyl decyl monoacid orthophosphate, propyl decyl monoacid orthophosphate, cetyl decyl monoacid orthophosphate, di(lauryl) monoacid orthophosphate, ethyl lauryl monoacid orthophosphate, oleyl lauryl monoacid orthophosphate, di(tetradecyl) monoacid orthophosphate, ethyl tetradecyl monoacid orthophosphate, di(cetyl) monoacid orthophosphate, ethyl cetyl monoacid orthophosphate, lauryl cetyl monoacid orthophosphate, di(stearyl) monoacid orthophosphate, ethyl stearyl monoacid orthophosphate, oleyl stearyl monoacid orthophosphate, di(oleyl) monoacid orthophosphate, ethyl n-octadecynl monoacid orthophosphate, ethyl oleyl monoacid orthophosphate, di (linoleyl) monoacid orthophosphate, ethyl linoleyl monoacid orthophosphate, di(eicosyl) monoacid orthophosphate, ethyl eicosyl monoacid orthophosphate, mono(eicosyl) diacid orthophosphate, mono(docosyl) diacid orthophosphate, ethyl docosyl monoacid orthophosphate, di(docosyl) monoacid orthophosphate, di (benzyl) monoacid orthophosphate, ethyl benzyl monoacid orthophosphate, di(phenyl) monoacid orthophosphate, ethyl phenyl monoacid orthophosphate, octyl phenyl monoacid orthophosphate, lauryl phenyl monoacid orthophosphate, di(isooctylphenyl) monoacid orthoacid orthophosphate, lauryl naphthyl monoacid orthophosphate, di(naphthyl) monoacid orthophosphate, mono(cresyl) diacid orthophosphate, di(cresyl) monoacid orthophosphate, di(xylyl) monoacid orthophosphate, di(methylcyclohexyl) monoacid orthophosphate, di(cyclohexyl) monoacid orthophosphate, di(cycloheptyl) monoacid orthophosphate, di(ethylcyclohexyl) monoacid orthophosphate, di(ethylcycloheptyl) monoacid orthophosphate, phenyl tolyl monoacid orthophosphate, methanephosphonic acid, ethanephosphonic acid, butanephosphonic acid, dodecanephosphonic acid, benzenephosphonic acid, monomethyl methanephosphonate, monoethyl methanephosphonate, monobutyl benzenephosphonate, dioctyl phosphinic acid, methyl hexyl phosphinic acid and the corresponding thio analogues of such acid esters of phosphorus.

The acid esters of phosphorus are conventional materials, and a number of them are commercially available. Accordingly, their method of preparation is not a part of this invention and it suffices to note that they can be prepared by reacting phosphorus pentoxide or phosphorus pentasulfide with alcohols or mercaptans, including thiophenols, in molecular proportions sufficient to give either mono- or diesterified compounds.

The organometallic compounds which can be used in preparing the novel compounds of the invention include the alkyl, aryl, aralkyl and alkaryl derivatives of the polyvalent metals selected from the group consisting of aluminum, indium, germanium, tin, antimony, mercury, thallium, lead and bismuth. Examples of the organometallic compounds which can be used thus include trimethylaluminum, triethylaluminum, triphenylaluminum, trimethylindium, triphenylindium, tetramethylgermanium, tetraphenylgermanium, tetramethyltin, tetraethyltin, dimethyldiethyltin, diethyldiisoamyltin, diethyldiphenyltin, dimethylethylpropyltin, ethyl-n-propyldiisoamyltin, tetraphenyltin, tetra-p-tolyltin, triethylphenyltin, triethyl-n-amyltin, diethyltin, di-p-tolyltin, diphenyltin, triethyltin, trimethylstibine, triethylstibine, triphenylstibine, dimethylmercury, diethylmercury, diphenylmercury, ditolylmercury, triphenylthallium, tetramethyllead, hexaethyldilead, tetraethyllead, tetra-n-propyllead, tetraisopropyllead, tetraisobutyllead, tetraphenyllead, trimethylbismuthine, triethylbismuthine and triphenylbismuthine. The organolead compounds and particularly the alkyllead compounds wherein the alkyl group contains 1 to 4 carbon atoms form a preferred group of compounds from which the corresponding alkyllead salts of the substituted acids of phosphorus are prepared.

Many of the organometallic compounds used in preparing the novel compounds of the invention are available commercially. Thus, neither the organometallic compounds nor their method of preparation is a part of this invention. Some of the organometallic compounds are prepared by decomposing the corresponding organometallic halide. The lower lead tetra-alkyls can be obtained from lead chloride and dialkylzinc or alkylmagnesium salts. However, when alkylmagnesium salts containing alkyl radicals with more than three carbon atoms are used, unsaturated leadalkyls such as lead tri-alkyls are preferentially formed. Tetraethyllead is conveniently prepared commercially from ethyl chloride and a sodium-lead alloy. Extreme caution should be observed in handling the organometallic compounds inasmuch as many of them are poisonous liquids, fuming and sometimes igniting in air.

The process used in preparing the novel compounds of the invention varies somewhat depending upon the particular compounds being reacted. According to one embodiment, 0.5 to 4 moles of the desired acid ester of phosphorus is admixed with 1 mole of the desired organometallic compound, preferably in an inert solvent such as xylene, toluene, etc. The mixture thus formed is thereafter heated to about 40° to about 60° C. to initiate the reaction. Once the reaction starts it is exothermic. The reaction rate may be followed by trapping and measuring the hydrocarbon evolved. The reaction is nearly complete in one to three or four hours, but may continue at a slow rate for another twenty-four hours or more. According to another embodiment, an alkali metal salt of the desired acid phosphate ester is reacted with a halide of the desired organometallic compound in an inert solvent such as benzene, hexane or toluene. The reaction mass thus obtained comprises the desired organometallic salt of the substituted acid of phosphorus in admixture with an alkali metal halide. The alkali metal halide is removed from the reaction mass by filtration. Upon removal of the inert solvent, a product comprising the desired organometallic salt of the substituted acid of phosphorus is obtained.

The following specific examples will serve to illustrate the preparation of the compounds of the invention.

EXAMPLE 1

*Triethyllead Di(Cresyl)Phosphate*

Into a 100 cc. round-bottom flask equipped with a thermometer and a reflux condenser are placed 16.2 grams (0.05 mole) of tetraethyllead and 13.9 grams (0.05 mole) of di(cresyl) monoacid orthophosphate. Reaction begins immediately and the temperature rises to about 60° C. Ethane is evolved rapidly. The reaction mixture is cooled to room temperature and allowed to stand overnight. The total ethane recovered during this period is about 1050 to about 1100 cc. The product is a clear viscous liquid soluble in hydrocarbons, and contains about 36.19 percent lead. The calculated amount of lead in the triethyllead salt of di(cresyl) monoacid phosphate is 36.10 percent.

EXAMPLE 2

*Triethyllead Isoamyl Octyl Phosphate*

Into a 100 cc. round-bottom flask equipped with a thermometer and a reflux condenser are placed 16.2 grams (0.05 mole) of tetraethyllead and 12 grams (0.05 mole) of isoamyl octyl monoacid orthophosphate. The reaction mass is heated slowly to about 40° C. at which temperature the reaction begins as evidenced by the evolution of gas. The temperature of the reaction mass rises slowly to about 70° C. The reaction mass is then cooled to room temperature and allowed to stand for about 24 hours while the ethane gas continues to be released slowly. The product comprises about 27.5 grams of a colorless liquid which contains 39.71 percent lead. The calculated amount of lead in triethyllead isoamyl octyl phosphate is 36.15 percent.

EXAMPLE 3

*Triethyllead Ethyl Oleyl Phosphate*

Into a 100 cc. round-bottom flask equipped with a thermometer and reflux condenser are placed 16.2 grams (0.05 mole) of tetraethyllead, 18.8 grams (0.05 mole) of ethyl oleyl monoacid orthophosphate and 50 cc. of xylene. The reaction mass thus formed is heated to about 80° C. and maintained at this temperature for about 1 hour. The reaction is substantially complete after maintaining the reaction mass at a temperature of about 80° to 90° C. for an additional hour. The product thus obtained is a clear amber liquid weighing about 75.1 grams. The product comprises a solution of triethyllead ethyl oleyl phosphate in xylene. Upon removal of the xylene the triethyllead salt analyzes about 31.40 percent lead. The calculated amount of lead in the triethyllead salt of ethyl oleyl monoacid orthophosphate is 31.00 percent.

EXAMPLE 4

*Triethyllead Ethyl Lauryl Phosphate*

Into a 100 cc. round-bottom flask equipped with a thermometer and a reflux condenser are placed 16.2 grams (0.05 mole) of tetraethyllead and 14.7 grams (0.05 mole) of ethyl lauryl monoacid orthophosphate. The reaction mass is then heated gradually to 40° C. at which temperature the reaction begins to take place and the temperature rises to about 70° C. The reaction mass is then held at about 65° C. to 70° C. for 3 hours. The reaction mass is then cooled to room temperature and allowed to stand overnight. The product, weighing 29.7 grams, is a clear viscous liquid, soluble in hydrocarbons and contains about 33.10 percent lead. The calculated amount of lead in the triethyllead salt of ethyl lauryl monoacid orthophosphate is 35.30 percent.

EXAMPLE 5

*Triethyllead Di(p-Isooctylphenyl)Phosphate*

The procedure of Example 3 is followed except di(p-isooctylphenyl) monoacid orthophosphate is substituted for ethyl oleyl monoacid orthophosphate. The resulting product comprises triethyllead di(p-isoocoylphenyl)phosphate.

EXAMPLE 6

*Triethyllead Di(Phenyl)Phosphate*

The procedure of Example 3 is followed except di(phenyl) monoacid orthophosphate is substituted for ethyl oleyl monoacid orthophosphate. The resulting product comprises triethyllead di(phenyl)phosphate.

EXAMPLE 7

*Triethyllead Di(Benzyl)Phosphate*

The procedure of Example 3 is followed except di- (benzyl) monoacid orthophosphate is substituted for ethyl oleyl monoacid orthophosphate. The resulting product comprises triethyllead di(benzyl)phosphate.

EXAMPLE 8

Triethyllead Methyl Amyl Phosphate

The procedure of Example 2 is followed except methyl amyl monoacid orthophosphate is substituted for isoamyl octyl monoacid orthophosphate. The resulting product comprises triethyllead methyl amyl phosphate.

EXAMPLE 9

Triethyllead Di(2-Ethylhexyl)Phosphate

The procedure of Example 2 is followed except di(2-ethylhexyl) monoacid orthophosphate is substituted for isoamyl octyl monoacid orthophosphate. The resulting product comprises triethyllead di(2-ethylhexyl)phosphate.

EXAMPLE 10

Triethyllead Di(Isooctyl)Phosphate

The procedure of Example 2 is followed except di(isooctyl) monoacid orthophosphate is substituted for isoamyl octyl monoacid orthophosphate. The resulting product comprises triethyllead di(isooctyl)phosphate.

EXAMPLE 11

Triethyllead Di(Cyclohexyl)Phosphate

The procedure of Example 2 is followed except di(cyclohexyl) monoacid orthophosphate is substituted for isoamyl octyl monoacid orthophosphate. The resulting product comprises triethyllead di(cyclohexyl)phosphate.

EXAMPLE 12

Triethyllead Ethyl Eicosyl Phosphate

The procedure of Example 3 is followed except ethyl eicosyl monoacid orthophosphate is substituted for ethyl oleyl monoacid orthophosphate. Upon removal of the xylene from the reaction mass the resulting product comprises triethyllead ethyl eicosyl phosphate.

It will be understood that the foregoing examples are illustrative only and that other organometallic salts of the substituted acids of phosphorus can be similarly prepared. There can be substituted in the above specific examples, in the same or equivalent proportions, other equivalent materials, disclosed herein, for example, triethylaluminum, triphenylindium, tetramethylgermanium, tetraethylgermanium, tetra-p-tolyltin, triethylstibine, diethylmercury, triphenylthallium, tetramethyllead, hexaethyldilead, tetraisopropyllead, tetraisobutyllead, tetraphenyllead, and triethylbismuthine. Also, other substituted acids of phosphorus can be substituted for the acids in the above examples, in the same or equivalent proportions, such as ethyl octyl monoacid orthophosphate, di(2-methylhexyl) monoacid orthophosphate, di(2-propylhexyl) monoacid orthophosphate, lauryl cetyl monoacid orthophosphate, cetyl decyl monoacid orthophosphate, phenyl tolyl monoacid orthophosphate, distearyl monoacid orthophosphate, dinaphthyl monoacid orthophosphate, or their diacid or thio analogues.

Specific examples of other salts within the invention are
dimethylaluminum ethyl octyl phosphate,
di(phenyl)indium cetyl decyl phosphate,
triethylgermanium dibutyl phosphate,
tri-p-tolyltin phenyl tolyl phosphate,
diethylstibine distearyl phosphate,
monoethylmercury dinaphthyl phosphate,
diphenylthallium ethyl octyl phosphate,
diethyllead bis [di(isooctyl)phosphate],
mis(trimethyllead) mono(2-ethylhexyl)phosphate,
bis(triethyllead) mono(n-octyl)phosphate,
bis(triethyllead) mono(isooctyl)phosphate,
bis(triphenyllead) mono(nonyl)phosphate,
bis(triisopropyllead) mono(p-tolyl)phosphate,
diethylbismuth di(2-methylhexyl)phosphate,
triethyllead di(phenyl)thionophosphate,
bis(triethyllead) mono(benzyl)thionophosphate,
triethyllead S-isoamyl-S-octyl phosphorodithioate,
triethyllead S-ethyl-S-oleyl phosphorotrithioate,
triethyllead di(isooctyl)thionophosphate,
triethyllead di(2-ethylhexyl)thionophosphate,
triethyllead di(p-isooctylphenyl)thionophosphate,
triethyllead di(p-tolyl)thionophosphate,
triethyllead di(cyclohexyl)thionophosphate,
di(triethyllead) octadecenephosphonate,
triethyllead salt of the ethyl ester of octadecenephosphonate and
triethyllead ethyl butyl phosphinate.

These compounds are useful as rodenticides and insecticides. The organolead salts are useful addition agents for hydrocarbons boiling in the gasoline boiling range. For example, when a gasoline containing the product described in Example 1, i.e., triethyllead di(cresyl)phosphate, is burned in an internal combustion engine operated under conditions wherein noise, including preignition, knock or rumble would normally be encountered such engine noise is markedly less than the noise encountered when the base gasoline is used alone.

In order to illustrate the improved preignition characteristics obtained with a fuel containing triethyllead di-(cresyl)phosphate, a test was employed in which the fuel was burned in commercially available multicylinder spark-ignition engines. These engines had a compression ratio of 10 to 1. In this test, the engines were operated on a cycling schedule consisting of three minutes at 1500 r.p.m. at a 15 brake horsepower load, followed by a one-minute idle at 450 r.p.m. The spark advance in each instance was the manufacturers' setting. The coolant temperatures in and out were 150° F. ($\pm 5°$) and 160° F. ($\pm 5°$), respectively. The oil temperature in all instances was 180° F. ($\pm 5°$). At the end of each twenty-four hours under the above-described cycling schedule, noise requirement determinations were made. After the noise requirement determinations were made, the engines were then put back on the cycling schedule for another twenty-four hours. The cycling and noise requirement tests were continued for nine 24-hour periods.

The noise requirement determinations were made according to three successive steps. If noise was encountered in step one, then steps two and three were omitted. If noise was encountered in step two, then only step three was omitted. Noise in this test is intended to include preignition, normal knocking or rumble. The three successive steps of the test are as follows:

(1) At a speed of 1100 r.p.m. the throttle is opened to detent (that is, the rear barrels of the carburetor are just open) at 1-inch Hg intake manifold vacuum.
(2) The engine speed is increased to 1300 r.p.m. at 3-inch vacuum.
(3) The engine is accelerated at 10-inch vacuum from 1300 to 2000 r.p.m., standard spark, and held at this setting for 3 seconds (throttle wide-open at end of 3-second period).

Aural observations are made at steps (1), (2) and (3) and preignition, rumble and knock are recorded.

Ratings are made on the tank fuel (99 research octane number) and the actual noise requirement determined by the use of a set of commercial reference fuels up to an octane number of 113.5. For noise requirements in the range of 113.5 to 120, leaded isooctane is used. Octane numbers above 100 are expressed in the approved extension scale, Wiese octane numbers, which are:

$$\frac{\text{Performance No.} - 100}{3} + 100$$

The data set forth in Table I summarize the results obtained when the test engines were operated under the above test procedure with the base gasoline and the base gasoline containing 0.3 times the theoretical amount of triethyllead di(cresyl)phosphate required to convert the lead added as tetraethyllead to lead orthophosphate. In reporting the results, the initial octane requirement (Initial ON) and the final octane requirement (Final ON) correspond to the octane requirement of the engine at the beginning and conclusion of the test. The "average octane number" signifies the octane requirement of the engine during the last five 24-hour periods.

TABLE I

|  | Engine A |  | Engine B |  |
|---|---|---|---|---|
| Make-up, percent by vol.: |  |  |  |  |
| Base gasoline [1] +3.0 ml. TEL/gal | 100 | 100 | 100 | 100 |
| Added, g./gal.: |  |  |  |  |
| Triethyllead di(cresyl)-phosphate [2] |  | 1.96 (0.3T) |  | 1.96 (0.3T) |
| Borderline Noise Requirement: |  |  |  |  |
| Initial, O.N | 91 | 95 | 93 | 91 |
| Final, O.N | 120+ | 104 | 120+ | 110 |
| Increase, O.N | 29+ | 9 | 27+ | 19 |
| Average octane number | 120+ | 102.4 | 120+ | 103.6 |

[1] The base gasoline was a blended gasoline made up of catalytically cracked gasoline, alkylate and "Platformate."
[2] Added as 2.81 g./gal. in the form of a 70% toluene concentrate.

The data in the foregoing Table I clearly indicate the improvement obtained when a small amount of triethyllead di(cresyl)phosphate is added to the base gasoline. It will be noted, for example, that the octane number requirement of the engines running on the base gasoline was 120+. The octane number requirement of the engines running on the base gasoline containing triethyllead di(cresyl)phosphate was 102.4 for Engine A and 103.6 for Engine B. The increase in octane requirement was less in both engines when operating with the improved gasoline than when operating with the base gasoline.

In addition to the above multicylinder engine tests, further tests were conducted in modified single cylinder CFR engines to determine the number of wild pings encountered while operating the engines over a period of about 7 days. The total number of wild pings encountered during the test is indicative of preignition tendencies of the fuel in an engine. In this test the number of wild pings are automatically counted by an electronic wild ping counter. The base gasoline in this test contained 2.8 ml. of tetraethyllead per gallon of gasoline. The base gasoline showed 5,000 wild pings during the 7-day test. The same gasoline which also contained 2.20 g./gal. (0.4T) of triethyllead di(cresyl)phosphate showed only 1000 wild pings over the same test period. Thus, the number of wild pings in the improved gasoline was 80% less than the number encountered in the base gasoline alone.

The octane ratings of gasoline both leaded and unleaded were improved by the addition of small amounts of triethyllead di(cresyl)phosphate as evidenced by the data in Table II.

The data in the foregoing Table II clearly show that the octane number of the fuel whether leaded or unleaded is improved by the addition of a small amount of triethyllead di(cresyl)phosphate. This is indeed surprising in view of the fact that organic phosphates generally do not give improved octane ratings to gasoline.

Fuels containing triethyllead di(cresyl)phosphate have a further advantage in that the top compression piston rings of the engines in which such fuels are burned show less wear. For example, the top compression ring of an engine operating with a base gasoline containing 2.8 ml. of tetraethyllead per gallon of gasoline showed an average wear of 2.8 milligrams with a high-detergent lubricating oil and 12.3 milligrams with a non-detergent type lubricating oil. Under the same conditions using the same lubricating oils and base gasoline additionally containing 1.4 g. of triethyllead di(cresyl)phosphate per gallon of gasoline, the average wear was reduced to 2.5 and 11.3 milligrams respectively. This wear was determined by the CLR radioactive ring wear test procedure. This result was indeed surprising inasmuch as the addition of other phosphorus-containing additives to gasoline generally increase the amount of wear as determined by this cold corrosive wear-type of test.

While my invention is described above with reference to various specific examples and embodiments, it will be understood that the invention is not limited to such examples and embodiments and may be variously practiced within the scope of the claims hereinafter made.

I claim:
1. An organolead salt of a substituted acid of phosphorus having the structural formula

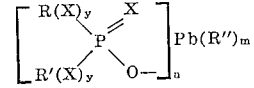

wherein X is selected from the group consisting of oxygen and sulfur; $y$ is an integer from 0 to 1; R is a substituent selected from the class consisting of alkyl, alkenyl, alkynyl, aryl, aralkyl, alkaryl, cycloalkyl groups; R' is a substituent selected from the class consisting of alkyl, alkenyl, alkynyl, aryl, aralkyl, alkaryl, cycloalkyl and Pb(R")₃ groups; R" is a substituent selected from the class consisting of alkyl, groups containing 1 to 4 carbon atoms and aryl, aralkyl and alkaryl groups containing 6 to 7 carbon atoms; $m$ is at least 1; $n$ is at least 1; $m+n$ is 4; and wherein the total number of carbon atoms in the radical

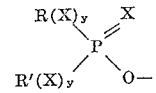

is 2 to 44.

2. An alkyllead salt of a substituted acid of phosphorus having the structural formula

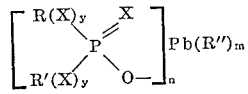

TABLE II

| Make-up, percent by vol.: |  |  |  |  |  |  |  |
|---|---|---|---|---|---|---|---|
| Base gasoline [1] (clear) | 100 | 100 |  |  |  |  |  |
| Base gasoline [1] +3.0 ml. TEL/gal |  |  | 100 | 100 |  |  |  |
| Regular grade of a commercial gasoline containing 2.1 ml. TEL/gal |  |  |  |  | 100 | 100 | 100 |
| Added, g./gal.: |  |  |  |  |  |  |  |
| Triethyllead di(cresyl)phosphate |  | 2.4 |  | 2.4 (0.4T) |  | 1.64 (0.4T) | 4.1 (1.0T) |
| Knock Ratings: |  |  |  |  |  |  |  |
| Motor Method, Octane No. | 82.6 | 83.1 | 87.4 | 87.5 | 83.5 | 83.9 | 83.8 |
| Research Method, Octane No. | 94.3 | 95.0 | 100.4 | 100.5 | 91.7 | 92.6 | 92.7 |

[1] The base gasoline was a blended gasoline made up of catalytically cracked gasoline, alkylate and "Platformate"

wherein X is selected from the group consisting of oxygen and sulfur; y is an integer from 0 to 1; R is a substituent selected from the class consisting of alkyl, alkenyl, alkynyl, aryl, aralkyl, alkaryl and cycloalkyl groups; R' is a substitutent selected from the group consisting of alkyl, alkenyl, alkynyl, aryl, aralkyl, alkaryl, cycloalkyl and Pb(R")₃ groups; R" is an alkyl group containing 1 to 4 carbon atoms; m is at least 1; n is at least 1; m+n is 4; and wherein the total number of carbon atoms in the radical

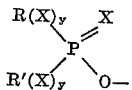

is 2 to 44.

3. An alkyllead salt of a substituted acid of phosphorus having the structural formula

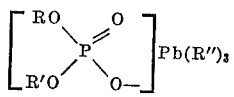

wherein R is a substituent selected from the class consisting of alkyl, alkenyl, alkynyl, aryl, aralkyl, alkaryl and cycloalkyl groups; R' is selected from the group consisting of alkyl, alkenyl, alkynyl, aryl, aralkyl, alkaryl, cycloalkyl and Pb(R")₃ groups; R" is an alkyl group containing 1 to 4 carbon atoms; and wherein the total number of carbon atoms in the radical

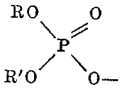

is 2 to 44.

4. Triethyllead di(cresyl)phosphate.
5. Triethyllead isoamyl octyl phosphate.
6. Triethyllead ethyl oleyl phosphate.
7. Triethyllead ethyl lauryl phosphate.
8. Triethyllead di(phenyl)phosphate.

References Cited in the file of this patent

UNITED STATES PATENTS

| | | |
|---|---|---|
| 2,252,984 | Rutherford et al. | Aug. 19, 1941 |
| 2,334,566 | Lincoln | Nov. 16, 1943 |
| 2,346,155 | Denison et al. | Apr. 11, 1944 |
| 2,480,823 | Morris | Sept. 6, 1949 |
| 2,544,858 | Hurt | Mar. 13, 1951 |
| 2,630,442 | Church et al. | Mar. 3, 1953 |
| 2,786,812 | McDermott | Mar. 26, 1957 |
| 2,877,251 | Fox et al. | Mar. 10, 1959 |

UNITED STATES PATENT OFFICE
CERTIFICATE OF CORRECTION

Patent No. 3,055,925                        September 25, 1962

Robert J. Hartle

It is hereby certified that error appears in the above numbered patent requiring correction and that the said Letters Patent should read as corrected below.

Column 2, line 32, for "n-octadecynl" read -- n-octadecynyl --; column 3, line 37, for "inaasmuch" read -- inasmuch --; column 5, line 72, for "mis" read -- bis --; column 8, line 27, for "inventtion" read -- invention --; line 44, after "alkyl" strike out the comma.

Signed and sealed this 19th day of February 1963.

(SEAL)
Attest:

ESTON G. JOHNSON
Attesting Officer

DAVID L. LADD
Commissioner of Patents